US010063060B2

(12) United States Patent
Beekmann et al.

(10) Patent No.: US 10,063,060 B2
(45) Date of Patent: Aug. 28, 2018

(54) METHOD FOR FEEDING ELECTRIC POWER INTO AN ELECTRIC POWER SUPPLY SYSTEM

(71) Applicant: Wobben Properties GmbH, Aurich (DE)

(72) Inventors: Alfred Beekmann, Wiesmoor (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 147 days.

(21) Appl. No.: 14/889,413

(22) PCT Filed: Apr. 29, 2014

(86) PCT No.: PCT/EP2014/058731
§ 371 (c)(1),
(2) Date: Nov. 5, 2015

(87) PCT Pub. No.: WO2014/180717
PCT Pub. Date: Nov. 13, 2014

(65) Prior Publication Data
US 2016/0111883 A1    Apr. 21, 2016

(30) Foreign Application Priority Data

May 7, 2013   (DE) .......................... 10 2013 208 410

(51) Int. Cl.
*H02J 1/00*     (2006.01)
*H02J 3/38*     (2006.01)
(Continued)

(52) U.S. Cl.
CPC ............ *H02J 3/386* (2013.01); *F03D 7/0284* (2013.01); *F03D 7/048* (2013.01); *H02J 3/48* (2013.01);
(Continued)

(58) Field of Classification Search
CPC ............ H02J 3/386; H02J 3/48; Y02E 10/721
(Continued)

(56) References Cited

U.S. PATENT DOCUMENTS

| 6,784,564 B1 | 8/2004 | Wobben |
| 6,891,281 B2 | 5/2005 | Wobben |

(Continued)

FOREIGN PATENT DOCUMENTS

| CN | 102340167 A | 2/2012 |
| CN | 102439297 A | 5/2012 |

(Continued)

OTHER PUBLICATIONS

Bundesverband der Energie- and Wasserwirtschaft e.V., "Technische Richtlinie Erzeugungsanlagen am Mittelspannungsnetz," Jun. 2008, 268 pages (with English Translation).

(Continued)

*Primary Examiner* — Alfonso Perez Borroto
(74) *Attorney, Agent, or Firm* — Seed IP Law Group PLLC (57) ABSTRACT

The invention relates to a method for feeding electric power from at least one wind power installation or of a wind farm into an electric supply system having a line voltage and a grid frequency, wherein the method for feeding electric active power and electric reactive power is prepared and the active power that is fed in can be adjusted by means of an active power control as a function of a grid state and/or the reactive power that is fed in can be adjusted by means of a reactive power control as a function of at least one grid state and the active power control or the reactive power control respectively specify a target value that is to be fed in, which value is adjusted by means of an adjustment function as a function of at least one grid state, wherein the adjustment function is specified with the help of points of support,
(Continued)

which points are defined by pairs of values each of which comprise a value for the active power or the reactive power respectively, and a value for the grid state.

9 Claims, 3 Drawing Sheets (51) Int. Cl.
*F03D 7/04* (2006.01)
*H02J 3/48* (2006.01)
*H02J 3/50* (2006.01)
*F03D 7/02* (2006.01)
*H02M 7/04* (2006.01)
*H02M 7/44* (2006.01)
*H02P 9/04* (2006.01)

(52) U.S. Cl.
CPC ............... *H02J 3/50* (2013.01); *H02M 7/04* (2013.01); *H02M 7/44* (2013.01); *F05B 2270/337* (2013.01); *H02P 9/04* (2013.01); *Y02E 10/721* (2013.01); *Y02E 10/723* (2013.01); *Y02E 10/763* (2013.01)

(58) Field of Classification Search
USPC .......................................... 307/82
See application file for complete search history.

(56) References Cited

U.S. PATENT DOCUMENTS

| | | | |
|---|---|---|---|
| 6,965,174 B2 | 11/2005 | Wobben | |
| 7,462,946 B2 | 12/2008 | Wobben | |
| 7,652,394 B2 | 1/2010 | Hirst | |
| 7,989,974 B2 * | 8/2011 | Fortmann | F03D 7/028 290/44 |
| 8,174,143 B2 | 5/2012 | Yasugi | |
| 8,368,238 B2 | 2/2013 | Yasugi et al. | |
| 9,287,814 B2 | 3/2016 | Yasugi et al. | |
| 2008/0093856 A1 | 4/2008 | Stiesdal | |
| 2009/0140704 A1 | 6/2009 | Jurkat et al. | |
| 2010/0276931 A1 | 11/2010 | Wobben | |
| 2011/0301769 A1 | 12/2011 | Lovmand et al. | |

FOREIGN PATENT DOCUMENTS

| | | |
|---|---|---|
| JP | 61-69335 A | 4/1986 |
| JP | 2006-60961 A | 3/2006 |
| RU | 2221165 C2 | 1/2004 |
| RU | 2338311 C2 | 11/2008 |
| WO | 2007/006565 A2 | 1/2007 |
| WO | 2010018631 A1 | 2/2010 |
| WO | 2011158351 A1 | 12/2011 |
| WO | 2012117491 A1 | 9/2012 |

OTHER PUBLICATIONS

Mohseni et al., "Comparing Technical Connection Requirements for Large Wind Power Plants," Power and Energy Society General Meeting, San Diego, CA, Jul. 24-29, 2011, 8 pages.
Siemens AG, "Wie kann mit PCS 7 eine Polygonfunktion mit mehr als 8 Stiützstellen realisiert werden?," Feb. 12, 2010, retrieved from https://support.industry.siemens.com/cs/document/22000546/wie-kann-mit-pcs-7-eine-polygonfunktion-mit-mehr-als-8-st%C3%BCtzstellen-realisiert-werden?dti=0&lc=de-AT, 4 pages (with English Machine Translation).

* cited by examiner

METHOD FOR FEEDING ELECTRIC POWER INTO AN ELECTRIC POWER SUPPLY SYSTEM

BACKGROUND

Technical Field

The present invention relates to a method for feeding electric power of at least one wind power installation or of a wind farm into an electric supply system. Moreover, the present invention relates to a wind power installation for feeding electric energy into an electric supply system and it relates to a wind farm, which comprises a plurality of wind power installations, for feeding electric energy into an electric supply system.

Description of the Related Art

Figure 1:
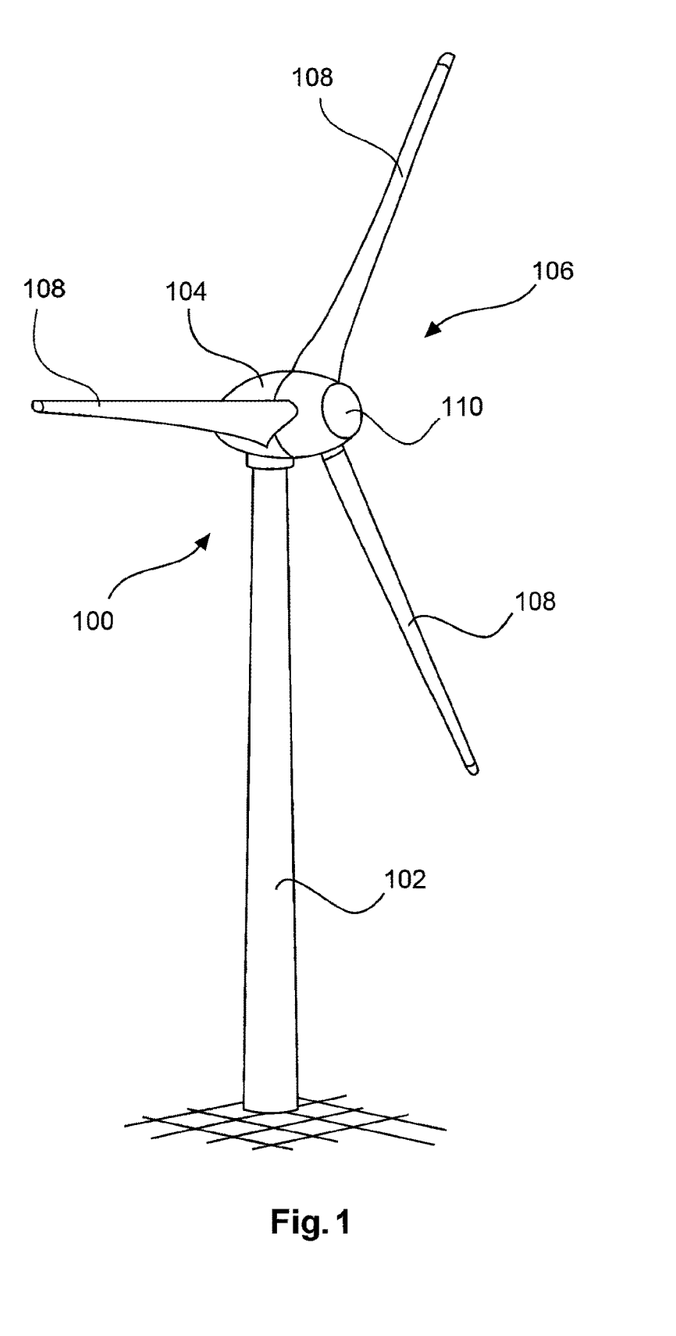
FIG. 1 schematically shows a wind power installation.
Figure 2:
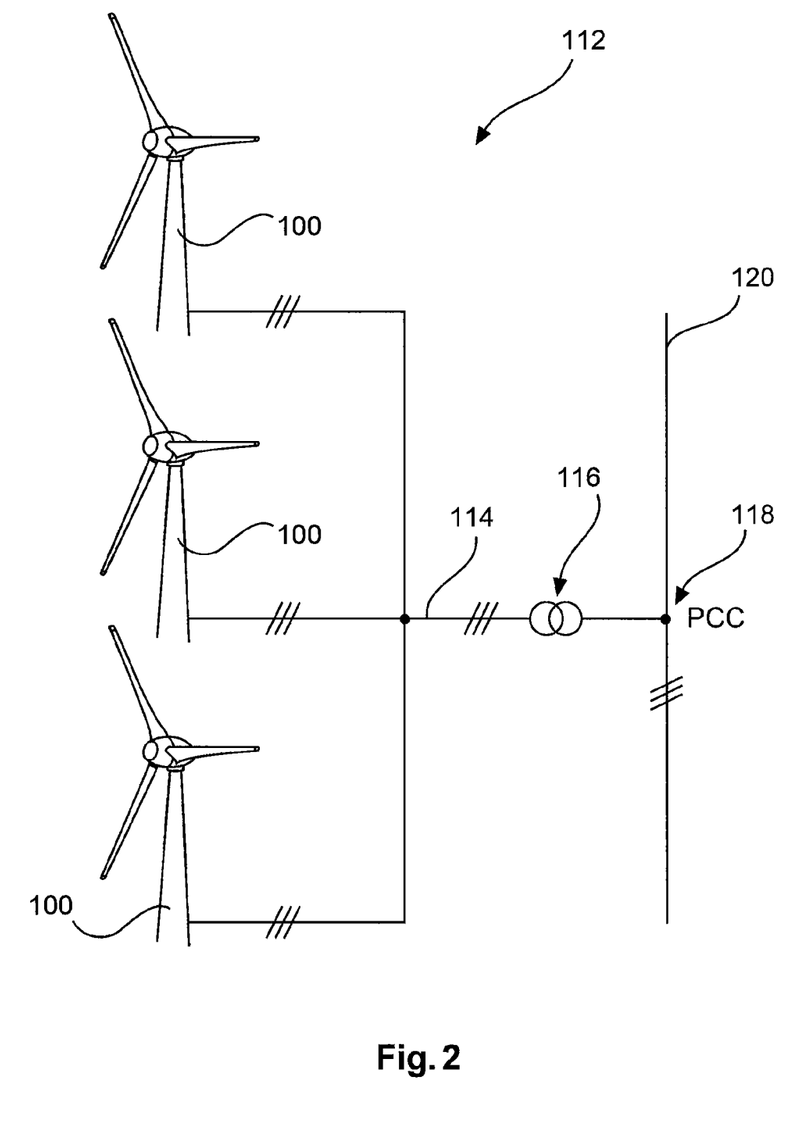
FIG. 2 schematically shows a wind farm.

A wind power installation is shown schematically in FIG. 1 and a wind farm is shown schematically in FIG. 2.

Wind power installations are generally known and, today, primarily serve the purpose of feeding into an electric supply system. In so doing, the wind power installation adjusts the current being fed in according to frequency and phase and taking into account the corresponding voltage on the electric supply system. This is a basic requirement, which must be satisfied in any case, and which is satisfied by known wind power installations. The same applies to a wind farm having a plurality of wind power installations, which jointly feed into an electric supply system by means of a joint point of common coupling (PCC). In this case, the wind farm feeds into the electric supply system.

It was recognized some time ago that it may not only be desirable to feed in as much electric power as possible into the supply grid with the wind power installation or the wind farm respectively, which supply grid will hereinafter be referred to as the grid for the sake of simplicity, but that it may also be desirable to use the wind power installation or the wind farm to support the grid. Corresponding proposals for solutions are described in patent applications U.S. Pat. Nos. 6,784,564, 6,891,281, 6,965,174 and 7,462,946. These applications already suggest that the power being fed in or the current being fed in be modified according to the magnitude and/or type thereof, as a function of a voltage or a frequency in the supply grid, in order to support the supply grid.

These days, the situation in many countries is such that wind power installations make up an ever increasing proportion of the total output in a supply grid. As a result, there is an increased need to support the grid by means of wind power installations. The dominance, and therefore the influence of the wind power installations in the grid is also increasing. Grid support by means of the wind power installations or wind farms in the grid can also be correspondingly effective.

BRIEF SUMMARY

One or more embodiments of this invention may address one or more of the aforementioned problems. In particular, one embodiment may satisfy or at least contribute to the increasing significance of the wind power installations in the support of the grid. In particular, grid support by means of wind power installations or wind farms respectively will be qualitatively and/or quantitatively improved. At least one alternative solution should be proposed.

In accordance with an embodiment of the invention, a method according to claim 1 is proposed. Accordingly, electric power of at least one wind power installation or a wind farm will be fed into an electric supply system. The supply grid has a line voltage and a grid frequency. The method is also prepared to feed an electric active power P and an electric reactive power Q. The method and, accordingly, the wind power installation or the wind farm respectively, which implements the method, is thereby prepared to feed electric active power, and also to feed electric reactive power.

The active power P that is fed in can thereby be adjusted by means of an active power control as a function of at least one grid state. The active power is thus not fixedly predetermined, or only fed in as a function of the prevailing wind, but rather is adjusted as a function of at least one grid state such as the grid frequency, for example.

In addition or alternatively, the reactive power Q being fed in is not fixedly predetermined, but rather is adjusted as a function of at least one grid state such as the line voltage, for example.

The active power control or the reactive power control is preferably carried out as a function of the grid sensitivity as a grid state. In particular it is proposed that the active power be reduced when the grid sensitivity increases in order to thereby stabilize the grid.

In addition, it is preferably proposed that a plurality, in particular two dependencies be taken into account simultaneously, thus two adjustment functions. For example, one adjustment function represents an active power as a function of the grid frequency, while the other adjustment function represents the active power as a function of the grid sensitivity. The smaller of each of the two adjustment functions is then taken into consideration.

In so doing, the active power control or the reactive power control respectively predetermine a target value that is to be fed in, which target value is adjusted by means of an adjustment function as a function of at least one grid state. The wind power installation or the wind farm, in particular an inverter used therefore, then converts this parameter and generates a corresponding current, in particular a corresponding three-phase current, by which the feeding in of the desired active power or the desired reactive power respectively into the supply grid is carried out.

It is proposed that the adjustment function be predefined with the help of points of support. Such points of support are each defined by a pair of values consisting of a value for the active power or by a value for the reactive power respectively, and by a value for the grid state, such as the grid frequency or the line voltage, for example.

Thus at least two such value pairs are given, which can thereby define the adjustment function, wherein additional information such as the forms of the function may be included if necessary. If two points of support, thus two pairs of values are used for the adjustment function or a partial section of the adjustment function, these points of support may in particular determine a start and an end point of the adjustment function or the partial function respectively.

For example, in the simplest case, for the control of the active power as a function of the grid frequency as a grid state, a section of an adjustment curve may be defined for the active power by means of two points of support with a straight line that connects these points of support. In so doing, the first point of support can be defined by means of the pair of values ($f_1$, $P_1$) and the second point of support may be defined by means of the pair of values ($f_2$, $P_2$), wherein $f_1$ and $f_2$ each represent a frequency value of the grid frequency and $P_1$ and $P_2$ represent the associated power value. This is merely a simple example of the active power as a function of the frequency. Additional points of support may preferably be specified and an improved function of the active power being fed in as a function of the grid frequency can thereby be predetermined.

According to one embodiment it is proposed that the adjustment function be modified as a function of a modification criterion. The modification criterion is thereby a criterion that determines whether a change is even made. If necessary, the modification criterion may also determine how a change is made. The modification criterion is explained in greater detail below and, in one case, may consist in an external parameter. The change is carried out, at least in part, in that at least one pair of values is modified. Thus, in the simplest case, the active power control and/or the reactive power control can be easily adapted to modified requirements by changing only a pair of values. The method can now determine a new course of the function based on a new set of value pairs, thus a new set of points of support and, if necessary, additional information regarding the course of the function between the points of support. Because the adjustment function is calculated pursuant to the proposed method as well as based on the points of support, this recalculation is feasible at least in a process computer without significant effort.

The adjustment function is preferably composed, at least in sections, of a plurality of partial functions. The adjustment function may also implement different courses of the function for different sections. Two of the partial functions—and according to one embodiment only two partial functions are used—are put together at each point of support and have the same value at this point of support. A composite adjustment function can thereby be easily implemented and in so doing, different ranges, in particular different ranges of the underlying grid state, can be taken into account. In the simplest case, it is thereby possible to determine an adjustment function having two partial functions by means of three pairs of values, thus by means of three points of support. The partial functions or at least one of the partial functions are preferably each specified by more than two points of support, however, in particular by more than three points of support. The respective adjustment function can thereby be modeled and as a result, for example, a transition between two partial functions can also be modified. Due to the fact that the partial functions have the same value at their joint point of support, a jump between these two partial functions can be avoided.

It is proposed that the adjustment function or at least a partial function of its kind preferably be
  a first-degree polynomial function,
  a second-degree polynomial function,
  a third or higher degree polynomial function,
  an exponential function,
  a hysteresis function,
  a trigonometric function or
  another non-linear function. A first-degree polynomial function describes a straight line. In this way, a function between two points of support can be easily defined. As compared to a first-order polynomial function, a second-degree polynomial function allows more complex functions, which can connect two points of support essentially in the manner of a curved function, as compared to a straight line. This curved function sometimes allows a better response to system requirements as compared to a straight line. This second-degree polynomial function can easily be defined by specifying a third point of support. The second-degree polynomial function can thus be uniquely defined by means of three points of support. It is clear that an advantageous adjustment function, which goes beyond a purely linear behavior, can thereby nevertheless be defined in the easiest conceivable manner.

In the case of a third or higher degree polynomial function, it is possible to implement further individualized adjustment functions. A turning point can already occur in a third-degree polynomial function, depending on the parameterization. Such a turning point may be unwanted; however that turning point or the corresponding underlying complex function respectively may thereby possibly avoid a combination in sections of a plurality of partial functions in the adjustment function. It is at least possible to subdivide the adjustment function into fewer sections.

An exponential function is characterized in particular by a slow, ever-increasing slope, which, in the case of the appropriate sign, may also be negative. A slight drop in power in conjunction with an increase in frequency may thereby initially be realized, for example for a frequency-dependent active power parameter, which drop in power then increases sharply, the active power thus dropping more quickly with the increasing frequency, and up to a maximum frequency with a very steep drop, may reach a power value of 0. In the event that, due to the circumstances, in particular the present topology, the power must reach the power value 0 at a predefined frequency value, such a negative exponential function makes it possible to maintain the power for as long as possible so that as little as possible of the available power is wasted.

Through the use of a hysteresis function, it is possible to achieve different characteristics in the adjustment function as a function of whether the underlying grid state is rising or falling.

Using a trigonometric function, thus in particular, a sine, cosine or tangent function respectively, or combinations or modifications thereof, special characteristics for the adjustment function can be achieved which are then comparatively easy to implement by means of specifying the points of support. For example, a function similar to a saturation function that is continuously differentiable can be obtained by means of a hyperbolic tangent function. A voltage-dependent reactive power control can be hereby defined, for example, thus an adjustment function which specifies a reactive power that is to be fed in as a function of the line voltage. In so doing, the zero point of this hyperbolic tangent function should be placed at the value of the nominal voltage of the line voltage.

Hyperbolic functions or logarithm functions or root functions are also suitable as other non-linear functions, to name but a few.

According to one embodiment it is proposed that the adjustment function or at least one of the partial functions thereof be determined by at least two points of support and their type, thus the type of adjustment function. In particular, the shape of the adjustment function can, in graphic terms, be determined by the kind of function or partial function. The function, which is now fixed in its shape, can now be concretely determined by means of the points of support, which in particular are disposed at the beginning and end of the function or partial function.

The adjustment function or at least a partial function is preferably determined through the use of a first-degree polynomial function and by specifying two points of support. This function or partial function is thereby uniquely determined. Alternatively, the adjustment function or at least a partial function is determined by using a second-degree polynomial function and specifying three points of support.

A more complex adjustment function can hereby be specified, which in so doing is uniquely determined by these three points of support.

According to one embodiment, the active power control and, in addition or alternatively thereto, the reactive power control is modified as a function of the grid sensitivity.

Grid sensitivity here means the grid's reaction, in particular in relation to the point of common coupling, to a change in a parameter affecting the grid. Grid sensitivity can be defined as the difference of a grid reaction in relation to a difference of a grid influence parameter. What comes into question here, in particular, is a definition in relation to the fed-in active power and line voltage level. Put in simplified terms, the following formula can be defined, for example, for the grid sensitivity NS:

$$NS = \frac{\Delta V}{\Delta P}$$

Here, ΔP describes the change in fed-in active power, namely the fed-in wind farm output, and ΔU describes the resulting change in the line voltage V. These differences are created over a very brief period of time, in particular in the area of one second or less, and advantageously, instead of using this descriptive formula, a partial derivation of the line voltage V can be also created based on the fed-in wind farm output P according to the difference of the voltage in relation to the difference of the power. Another possible grid reaction could be the change in grid frequency f. Another way of considering grid sensitivity would be to apply the following formula:

$$NS = \frac{\Delta f}{\Delta P}$$

The grid sensitivity is thus preferably used as a measure of the active power control to be selected and/or the reactive power control to be selected. If the grid sensitivity changes at least significantly, the type and/or parameterization of the corresponding active power control and/or the corresponding reactive power control may be modified. A change in the type corresponds in this respect to the change in the type of control, which here is used synonymously. Alternatively, the grid sensitivity may directly influence the control, in particular the active power control, namely as an underlying grid state.

According to an additional embodiment, the active power control and/or the reactive power control may be modified as a function of the short-circuit ratio at the feed point.

Short circuit ratio (also referred to as SCR) means the ratio of short circuit power to connected load. Short circuit power is the power that the respective supply grid can provide at the considered point of common coupling to which the wind power installation or, respectively, the wind farm is connected, if there is a short circuit at the point of common coupling. The connected load is the connected load of the connected wind power installation or, respectively, of the connected wind farm, and thus—in particular—the nominal power of the generator that is to be connected or, respectively, the sum of all nominal powers of the generators of the wind farm. The short circuit ratio is thus a criterion for the strength of the electric supply system in relation to such considered point of common coupling. A strong electric supply system relating to said point of common coupling has mostly a large short circuit ratio of, for example, SCR=10 or greater.

It has been recognized that the short circuit ratio can also provide information on the behavior of the respective supply grid at the point of common coupling. The short circuit ratio may also vary.

When installing a wind farm or wind power installation for the first time, it is advantageous to consider the short circuit ratio and to adapt the active power control and the reactive power control thereto. Preferably, it is further proposed to record the short circuit ratio on a regular basis even after the installation and commissioning of a wind power installation or wind farm. The short circuit power can be recorded, for example, based on information on the grid's topology using simulation. The connected load can be determined simply by having knowledge of the wind power installations installed at a wind farm and/or by measuring the power fed in at nominal wind.

A connected load for the proposed calculation and taking into account of the short-circuit ratio is preferably defined and calculated as the sum of the nominal power of all respective, currently available wind power installations. In this sense, the connected load would already change were one wind power installation to fail, at least on a temporary basis. The short circuit current ratio would thereby also change and this could trigger a change in the active power control and/or the reactive power control.

According to an additional embodiment, it is proposed that the connected load be calculated as the sum of the currently available power in the wind farm taking into account the prevailing wind conditions, or that instead of the connected load of the wind farm, the sum of the currently available power of the wind farm be used in the calculation of the short-circuit ratio and/or be used as a modification criterion for the modification of the active power control and/or of the reactive power control. The short circuit current ratio is thus recalculated for this wind farm output thus determined, in order to determine this modification condition, or a modification criterion can also be derived directly from the power available in the wind farm.

For example, the switching condition may be such that a parameter such as an amplification factor or the increase of a function is dependent on the short circuit current ratio, or another criterion. A proportional dependence could exist, for example. As a further example, which is not limiting, however, a limit value can be determined and a switch made from an active power control to another active power control of the same type when the short circuit current ratio or another criterion exceeds or falls below this limit value respectively. The same applies to the modification of the reactive power control.

The active power control and/or reactive power control is preferably modified by means of an external parameter, for example by means of an external signal, which is entered on a process computer, which carries out the active power control and/or the reactive power control. Such a parameter specification is preferably done by a grid operator, who transmits such an external signal for that purpose.

One or more parameters may also be hereby modified, or a switch is made to another type or another kind of active power control or reactive power control. According to one embodiment, the desired, new configuration of the respective active power control or reactive power control may also be transmitted. Parameters that are to be changed may also be transmitted, or a new algorithm may even be transmitted.

Pairs of values for determining the point of support are preferably hereby transmitted. It is at least proposed that a pair of values be transmitted.

According to one embodiment, it is proposed that a reactive power control or an adjustment function respectively for the reactive power control be modified as a function of the active power that is and/or that can be fed in of the wind power installation or of the wind farm respectively, in particular such that in the case of a lower active power that is or that can be fed in, a switch is made to a reactive power control, or the active power is modified in such a way that a higher reactive power is fed in depending on the amount, and/or that the reactive power control has a higher reactive power final value to be fed in depending on the amount.

In addition, a wind power installation is proposed that is prepared for the implementation of a method pursuant to one of the described embodiments. In particular, such a wind power installation has a corresponding process computer and a corresponding frequency inverter, which is suitable for performing such a reactive power feed and/or active power feed. In particular, the inverter used or the wind power installation used should be FACTS-capable.

In addition, a wind farm is proposed that is prepared for the implementation of a method pursuant to one of the described embodiments. In particular, it is prepared to feed electric active power and electric reactive power into a supply grid and also to use a modifiable active power control and/or a modifiable reactive power control. This wind farm preferably uses a point of common coupling to feed electric power into the supply grid. It is also advantageous for the wind farm if it is FACTS-capable.

BRIEF DESCRIPTION OF THE SEVERAL VIEWS OF THE DRAWINGS

The invention is now described in more detail below using embodiments as examples with reference to the accompanying figures.

FIG. 3 schematically shows a wind power installation, which uses a method according to the invention according to one embodiment for feeding in.

DETAILED DESCRIPTION

FIG. 1 shows a wind power installation 100 having a tower 102 and a nacelle 104. A rotor 106 with three rotor blades 108 and a spinner 110 is arranged on the nacelle 104. When in operation, the rotor 106 is brought to a rotating movement by the wind and thereby drives a generator in the nacelle 104.

FIG. 2 shows a wind farm 112 with, for example, three wind power installations 100, which may be the same or differ. The three wind power installations 100 are thus representative of a basically random number of wind power installations of a wind farm 112. The wind power installations 100 provide their power, in particular the generated electricity, via an electric wind farm grid 114. The currents or, respectively, powers generated by the individual wind power installations 100 are added up. Most often, a transformer 116 will be provided, which steps up the voltage at the wind farm to then feed it into the supply grid 120 at the feeding point 118, which is also generally referred to as a PCC. FIG. 2 is merely a simplified illustration of a wind farm 112, which does not show, for example, a control, although a control exists, of course. Also, the wind farm grid 114 may be designed differently, including, for example, a transformer at the output of each wind power installation 100, to mention just one other embodiment.

Figure 3:
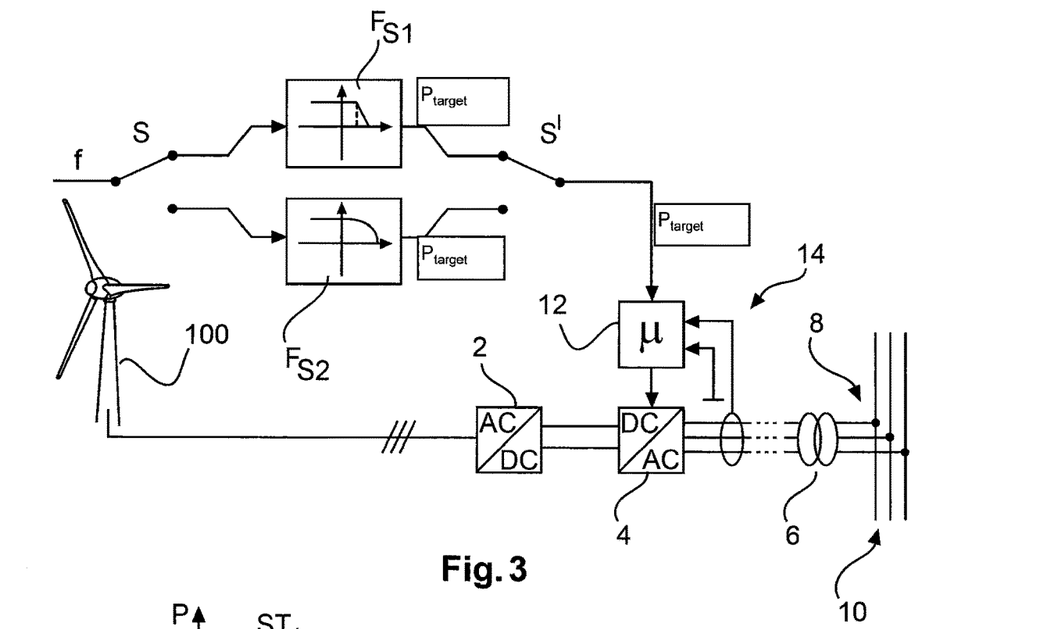

FIG. 3 illustrates a wind power installation 100, which supplies a three-phase generator current to a rectifier 2, for example, which in turn is connected to an inverter 4 that generates a three-phase alternating current in order to feed this current into a feed point 8 (PCC) in an electric supply system 10 by means of a transformer 6. The inverter 4 is controlled by means of a control unit 12, which may be formed out of one or a plurality of process computers, for example. The control unit 12 also utilizes measured values, for example concerning current and voltage according to the amplitude, frequency and phase of the three-phase current that it outputs. For this purpose, a measurement feedback 14 is shown by way of illustration.

The structure of FIG. 3 also shows that the control unit 12 also takes into account a power set point and that the inverter 4 is accordingly controlled in such a way that it outputs such a desired power P. Ideally, the power P output by the inverter 4 is identical to the target power $P_{set}$, so that $P=P_{set}$. In addition, it may ideally be assumed for the present considerations that the power P generated is also the power that is fed into the grid 10. In the case of the present considerations, losses between the target power and the power that is generated in the feeding in and in dynamic processes may thus be disregarded.

The structure of FIG. 3 now shows that this active power set point $P_{set}$, and thereby ideally the active power P to be fed in as well, are determined or defined respectively as a function of the frequency f. To this end, there are two adjustment functions $F_{S1}$ and $F_{S2}$ available, which are shown here representing further adjustment functions. A switch S and a cooperating switch S' are now shown, which illustrate that depending on the position of the switch, thus depending on the selection made, the active power $P_{set}$ can be defined by means of the first or second adjustment function $F_{S1}$ or $F_{S2}$ respectively. The option to choose by means of the switch S or S' respectively is, in this respect, only an illustration and such an option to choose may also be implemented in the control unit 12 for example, so that the control unit 12 thus directly receives the grid frequency f. In addition, such switching is preferably implemented in the process computer, wherein said computer accesses a corresponding data memory, for example depending on the adjustment function that is selected, in which data memory the desired adjustment function is stored.

FIG. 3 illustrates that an adjustment function for the active power that is to be fed in and therefore an active power control can be modified. Here, an active power control as a function of the grid frequency f is shown by way of example. The illustration is also representative of a control as a function of another grid state such as the line voltage or a modification of the grid frequency. Analogously, a reactive power control that is a function of the grid state can also be implemented in the manner described and shown therein. Here as well, different grid states can be used as initial parameters for the reactive power control.

Figure 4:
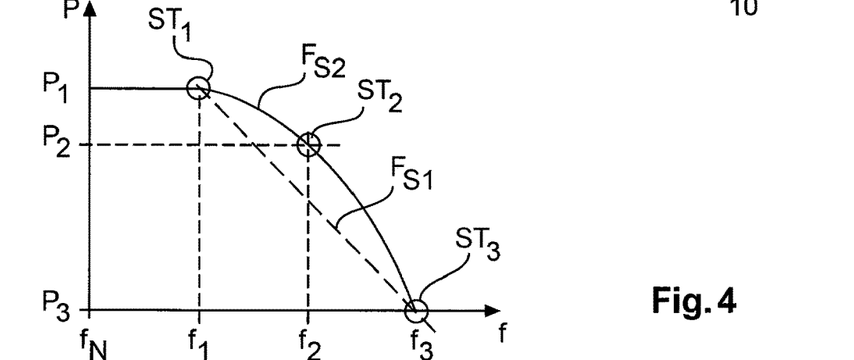
FIG. 4 illustrates the specification of an adjustment function with the help of points of support for a frequency-dependent active power control.

FIG. 4, for example, shows a frequency-dependent active power control as the underlying adjustment function is defined according to one embodiment. For ease of illustration, this is shown using the adjustment function $F_{S2}$ as an example, which is also included as a pictogram in the schematic representation of the Figure. The adjustment function $F_{S1}$ is likewise shown in FIG. 4 as a dashed line, insofar at any rate as it differs from the adjustment function $F_{S2}$ and essentially corresponds to the adjustment function $F_{S1}$ as used in FIG. 3 and indicated in the pictogram.

According to FIG. 4, the adjustment function $F_{S2}$ is shown by means of the grid frequency f from the nominal frequency $f_N$ to the frequency $f_3$. This adjustment function has a partial function, which is determined by the frequency $f_1$ to the frequency $f_3$.

This partial function is a second-degree polynomial function and can be generally described as $$P = a + b \cdot f + c \cdot f^2.$$

The points of support $ST_1$, $ST_2$ and $ST_3$ are used in order to specify this partial function. The respective points of these points of support are highlighted by a circle. These points of support are defined by the following pairs of values:

$$ST_1 = (f_1, P_1); ST_2 = (f_2, P_2) \text{ and } ST_3 = (f_3, P_3).$$

It is clear that a continuous adjustment function $F_{S2}$ was thereby easy to define, said function having advantages as compared to the first adjustment function $F_{S1}$, which is shown as a dashed line. The second adjustment function $F_{S2}$ shown is especially suited for grid support, because it can reduce the active power in a frequency-dependent manner, wherein at the same time, more power can be fed in as compared to the first reference adjustment function $F_{S1}$. This is clearest at the second point of support $ST_2$, at which the second adjustment function $F_{S2}$ feeds in significantly more power than the first adjustment function $F_{S1}$. In so doing, specifying this to this extent more favorable adjustment function $F_{S2}$ is very simple in that only the three points of support $ST_1$, $ST_2$ and $ST_3$ shown are defined. The first and third point of support $ST_1$ or $ST_3$ respectively make specification for the adjustment function $F_{S2}$ possible by means of specific start and end points for this partial section of the second adjustment function. The first and second adjustment function $F_{S1}$ and $F_{S2}$ have the same value at these points of support. The agreement of these values can be easily implemented insofar as these points are precisely defined as a first and third point of support $ST_1$ or $ST_3$ respectively. The course of this second adjustment function $F_{S2}$ can easily be improved by means of the middle point of support $ST_2$. A desired higher power feed at the frequency $f_2$ can thereby be specified directly, for example.

FIG. 4 thus illustrates a way of specifying a frequency-dependent active power control or an appropriate adjustment function respectively by means of points of support. In a practical application, the power value $P_1$ may correspond to the nominal power of the underlying wind power installation or of the underlying wind farm respectively. The frequency $f_1$ may be a threshold frequency, starting at which the power must be reduced in the case of a further increasing grid frequency f. The value $P_3$ may correspond to the power value 0 and the associated grid frequency $f_3$ may represent an upper frequency, above which power is no longer fed in. The power value $P_2$ represents an auxiliary power, which may be selected as described above, specifically to increase the power. Accordingly, the grid frequency $f_2$ of this second point of support $ST_2$ is a value between the threshold frequency $f_1$ and the uppermost frequency $f_3$ and is advantageously selected with an equidistant spacing between these two values. In addition, yet another frequency $f_N$ is plotted in the diagram, which can represent the nominal frequency of the grid frequency. In this case, the adjustment function $F_{S2}$ runs horizontally between the first point of support and the power value $P_1$ at the nominal frequency $f_N$, so that no power reduction occurs in this region.

Figure 5:
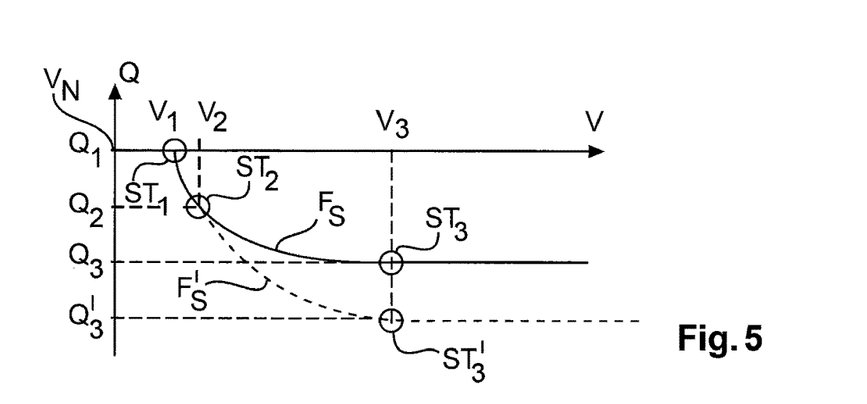
FIG. 5 illustrates the specification of the adjustment function with the help of points of support and an option for variation for the example of a line-voltage dependent reactive power control.

FIG. 5 selects an additional example of the specification of an adjustment function $F_S$. This adjustment function $F_S$ specifies a reactive power Q as a function of the line voltage V. In FIG. 5, only the partial function of the line voltage $V_1$ up to the line voltage $V_3$ is considered. For line voltages less than $V_1$ up to the nominal line voltage $V_N$, the adjustment function may run horizontally and take the value 0, so that no reactive power is fed in, or should be fed in respectively, in the region. Above the line voltage $V_3$, the reactive power likewise extends at a constant value, namely the value $Q_3$. Alternatively, it may also be provided that the wind power installation is also shut down for voltages in this range.

The adjustment function $F_S$ shown is now specified by the points of support $ST_1$, $ST_2$ and $ST_3$, which here have the same designation as in FIG. 3, but naturally have completely different values; specifically, they are specified by the following pairs of values:

[[$ST_1 = (U_1, Q_1); ST_2 = (U_2, Q_2)$ and $ST_3(U_3, Q_3)$.]]

$$ST_1 = (V_1, Q_1); ST_2 = (V_2, Q_2) \text{ and } ST_3 = (V_3, Q_3).$$

Thus an adjustment function for the reactive power as a function of the line voltage V is specified here in a fairly simple manner. It has the value $Q_1$, in particular specifically 0, as long as the line voltage has not yet exceeded the voltage value $V_1$. As the line voltage V further increases, the reactive power Q increases to the value $Q_3$, which is reached at the line voltage value $V_3$. In order to achieve a sharp increase, having a negative sign, for the reactive power right at the beginning, however, the second point of support $ST_2$ is specified for the line voltage value $V_2$ having a correspondingly high reactive power value $Q_2$ according to the amount. A high reactive power, having a negative sign, can thereby be initially fed in very quickly in order to be able to thereby quickly counteract an additional increase in line voltage, in particular when a long and/or dominant inductive access line to the grid or connecting line in the grid is present. In addition, a similar or identical adjustment function, essentially point mirrored by means of the point $(V_N, Q_1)$, can be used for a voltage drop. It is then proposed that in the same manner, namely in the case of a corresponding drop in the line voltage below the nominal voltage value $U_N$, that positive reactive power be fed in in order to counteract a further drop in voltage.

FIG. 5 also illustrates the possibility of further increasing the reactive power value $Q_3$ according to the amount, said reactive power initially representing a maximum value according to the amount for the reactive power feed. In particular, it is proposed that such a further increase be provided when the wind power installation or the wind farm, which underlies the reactive power feed illustrated here, feeds in little active power or even no active power. For example, a criterion may be provided whereby the maximum reactive power value may be increased according to the amount when the active power being fed in falls below 50 percent of its nominal power, to name just an exemplary value. In order to give another example, a change in the reactive power value $Q_3$ may also be proposed if no active power is fed in at all. It has been shown that a higher reactive power can be fed in when less active power is fed in.

In order to make such a modification to the adjustment function $F_S$, in order to obtain the adjustment function $F_S'$ shown as a dashed line, only the third point of support $ST_3$ must be changed into the modified point of support $ST_3'$. The second point of support $ST_2$ can also be modified, however in the illustration shown in FIG. 5, it has not been modified. What can hereby be achieved is that the increase function according to the amount for the reactive power that is to be fed in, which is already very powerful, does not need to be further increased, but instead, only the aforementioned third point of support $ST_3$ to $ST_3'$.

FIG. 5 thus shows the specification of three points of support $ST_1$, $ST_2$ and $ST_3$ or $ST_3'$ respectively and can thereby fixedly define a second-degree polynomial function. Another partial section of the adjustment function $F_S$ is arranged at the first point of support $ST_1$ and likewise at the third point of support $ST_3$ or $ST_3'$ respectively. Alternatively, another function may be taken as a basis, for example a hyperbolic tangent function or root function.

The invention claimed is:

1. A method for feeding electric power generated by at least one wind power installation or a wind farm into an electric supply grid having a line voltage and a grid frequency, the electric power includes an electric active power and an electric reactive power, the method comprising:
    adjusting, as a function of at least one state of the grid, the active power that is fed in using an active power control;
    adjusting, as a function of at least one state of the grid, the reactive power that is fed in using a reactive power control; and
    for the active power control and the reactive power control, respectively, specifying target values to be fed in, each of which are adjusted by an adjustment function as a function of at least one state of the grid, wherein the adjustment function is specified with points of support that are defined by pairs of values for the active power, reactive power, and the state of the grid, respectively, wherein the adjustment function is modified as a function of at least one of the following:
    a grid sensitivity,
    a short-circuit ratio, and
    an external parameter provided by an external signal.

2. The method according to claim 1, wherein the adjustment function is modified as a function of a modification criterion that includes modifying at least one of the pairs of values.

3. The method according to claim 1, wherein the adjustment function includes, at least in sections, a plurality of partial functions, and at least two of the partial functions are put together at one of the points of support and have the same value at the point of support.

4. The method according to claim 1, wherein the adjustment function is at least one of:
    a first-degree polynomial function,
    a second-degree polynomial function,
    a third or higher degree polynomial function,
    an exponential function,
    a hysteresis function,
    a trigonometric function, and
    a non-linear function.

5. The method according to claim 1, wherein the adjustment function is determined by at least two points of support.

6. The method according to claim 1, wherein the adjustment function is determined using a first-degree polynomial function and a specification of two points of support or using a second-degree polynomial function and a specification of three points of support.

7. The method according to claim 1, wherein the adjustment function is adjusted as a function of at least one of the following:
    the line voltage,
    the grid frequency, and
    the grid sensitivity.

8. A wind power installation for feeding electric power into a supply grid, the wind power installation comprising:
    a rotor; and
    a plurality of rotor blade coupled to the rotor, wherein the wind power installation is configured to feed in electric power into an electric supply grid using the method according to claim 1.

9. A wind farm comprising:
    a plurality of wind power installations, each configured to generate electric power and to supply the generated electric power into a supply grid, wherein the plurality of wind power installations feed in the electric power using the method according to claim 1.

* * * * *